United States Patent [19]

Terpstra et al.

[11] Patent Number: 5,313,396
[45] Date of Patent: May 17, 1994

[54] METHOD OF OPERATION OF A NAVIGATIONAL CALCULATOR

[75] Inventors: James E. Terpstra, Highlands Ranch; Donald R. Sellars, Aurora; William A. King, Jr., Aurora; Karel R. Hajda, Aurora, all of Colo.

[73] Assignee: Jeppesen Sanderson, Inc., Englewood, Colo.

[21] Appl. No.: 687,040

[22] Filed: Apr. 16, 1991

[51] Int. Cl.$^5$ ............................................. G01C 21/20
[52] U.S. Cl. .................................... 364/443; 364/700; 364/710.01; 364/710.07
[58] Field of Search ................... 364/443, 700, 710.01, 364/710.07

[56] References Cited

U.S. PATENT DOCUMENTS

| | | | |
|---|---|---|---|
| 3,924,111 | 12/1975 | Farris | 364/443 |
| 3,967,098 | 6/1976 | Harnagel et al. | 364/443 |
| 3,979,057 | 9/1976 | Katz et al. | 364/443 |
| 4,156,912 | 5/1979 | Shigeta et al. | 364/443 |
| 4,236,212 | 11/1980 | Arents | 364/424 |
| 4,796,190 | 1/1989 | Cummings | 364/443 |
| 4,831,538 | 5/1989 | Cucchiari et al. | 364/443 |

Primary Examiner—Jack B. Harvey
Assistant Examiner—Thomas Peeso
Attorney, Agent, or Firm—Sheridan Ross & McIntosh

[57] ABSTRACT

The present invention provides a method of communicating information between a navigational computer and a user by the input and output devices associated with the navigational computer to determine a navigational parameter. The method includes the step of using the input device to select a navigational parameter whose value is to be determined by the navigational calculator. The preferred method includes the step of using the output device to display all of the variables required to calculate the selected navigational parameter. Also included in the method of the present invention is the step of using the input device to define the values associated with the variables necessary to calculate the selected navigational parameter in any order that is convenient to the user. Moreover, the user can change the value associated with a variable until the desired value is attained without having to redefine the values associated with other variables. The present invention also allows the user to change the value of a previously calculated parameter and then determines the effect of this change on the value of one of the variables used to initially calculate the navigational parameter.

32 Claims, 10 Drawing Sheets

METHOD OF OPERATION OF A NAVIGATIONAL CALCULATOR

BACKGROUND OF THE INVENTION

1 Field of the Invention

The present invention relates to a method of operation of a navigational calculator and, in particular, to the method by which a navigational calculator interfaces with a user by its input and output devices.

2. Description of the Related Art

Presently, there are several different types of navigation calculators available. A common characteristic of substantially all navigational calculators is that they each possess an input device that allows a user to communicate with the navigational calculator and an output device that allows the calculator to communicate with the user. Typically, the input device is a keyboard and the output device is a display screen, such as a CRT, LED, or LCD.

An important feature that distinguishes several of these different types of navigational calculators from one another is the method in which the user and the calculator communicate via the input and output devices in the course of computing a navigational parameter. One general approach that is employed by several navigational calculators requires the user to enter the value of a variable that is necessary to the calculation of a particular navigational parameter into the calculator using a keyboard and, either before or after entry of the value, identify the variable with which the value is associated using the keyboard. Once the user has entered the values for all of the variables necessary to calculate the desired navigational parameter, the user causes the navigational calculator to compute the desired navigational parameter by actuating the appropriate key on the keyboard. An example of a navigational calculator that implements this method is discussed in U.S. Pat. No. 4,156,912. A drawback of the method is that the user must know all of the variables that need to be defined in order to calculate a particular navigational parameter. This can be overwhelming in navigational calculators that are capable of computing more than a few navigational parameters or where a particular navigational parameter requires that the values of a substantial number of variables be defined. Consequently, this method is typically used with navigational calculators that compute a relatively small number of navigational parameters. Such a navigational computer is discussed in U.S. Pat. No. 4,236,212.

Another method that is used to transfer information between a user and a navigational calculator via the calculator's input and output devices requires the user to select, at the outset of the computation, the navigational parameter that is to be calculated using the input device. Once the user has selected a navigational parameter, the calculator then prompts the user to enter the values of the variables necessary to compute the selected navigational parameter in a predetermined order or sequence that is dictated by the navigational calculator. An example of this method is discussed in U.S. Pat. No. 3,979,057. One drawback associated with this method is that the user is required to define the values of the variables in a defined sequence. This can be quite inconvenient if, for example, the pilot of an aircraft must look at a piece of instrumentation on one side of the cockpit to obtain the value of one variable, then look at an instrument on the other side of the cockpit in order to obtain the value for the next variable in the sequence, and then look back again to the other side of the cockpit for the next variable in the sequence.

Another drawback typically associated with navigational calculators where the user is required to enter data in a particular order is that once a value for a variable is fixed or defined it often cannot be changed without starting the entire navigational computation process over. Obviously, this can be quite burdensome if the calculation of a particular navigational parameter requires that the values of several variables be defined.

Yet another disadvantage that is associated with the manner in which the method of initially selecting a navigational parameter and then subsequently entering data in a defined sequence is typically implemented is that, following the selection of the navigational parameter that is to be calculated, the navigational calculator displays the values of the variables necessary to calculate the selected navigational parameter from the last calculation in which the values of the variables were provided or determined. This disadvantage may also be present in navigational calculators that implement the initially discussed method where the user initially enters the values of variables and subsequently identifies the navigational parameter that is to be calculated using the values of the variables previously entered. If, as typically happens, the user is momentarily distracted when entering the value of a particular variable, then the old value for the variable may be entered by the user and result in the calculator computing an erroneous value for the selected navigational parameter that, if detected, will necessitate that the calculation be repeated.

Another undesirable feature that may be associated with practicing the method of initially selecting a navigational parameter and then subsequently entering data in a defined sequence is that in navigational calculators where a multi-line display is used, such as the one discussed in U.S. Pat. No. 4,831,538 ('538), is that, following the selection of the navigational parameter that is to be computed, the calculator displays the selected navigational parameter together with the last value calculated for the navigational parameter and continues to display this value while the user enters the required data to make the calculation. This is typically quite confusing because a user may not realize that the value of the selected parameter being displayed is from a previous calculation and, instead, believe that the displayed value is based upon the values of the variables that the user has entered.

A further disadvantage that is typically associated with navigational calculators that implement the method of initially selecting a navigational parameter and then entering data in a defined sequence where a navigational calculator with a multi-line display is used is that variables other than those required to calculate the selected navigational parameter are displayed. This, too, can be quite confusing to the user of a flight calculator.

The navigational calculator disclosed in the '538 appears, as many of the other presently known navigational calculators, to allow the user to change the value of a variable used in the calculation of a navigational parameter to determine the effect of the change in value of the variable on the value of the navigational parameter. For instance, a navigational calculator may have determined the distance an airplane would travel based upon the ground speed and time of flight information provided by the user. The user may then wish to determine how much further the airplane would travel based on the same ground speed but a greater amount of time than was initially used. Navigational calculators, such as that discussed in the '538 patent, appear to allow the user to change the time of flight and then recompute the distance that would be traveled based on the ground speed used in the initial calculation and the new time of flight. While this is a desirable feature in many situations, it is inefficient in situations where the user wishes to determine the effect of changing the value of a previously calculated navigational parameter on one of the variables used to calculate the navigational parameter. For example, if the user wanted to determine the time of flight necessary to cover a distance different than that in the initial calculation using the same ground speed that was used in the initial calculation, the user would have to make a guess on the time of flight that would, based on the ground speed used in the initial calculation, result in the required distance. The user would then have to provide the calculator with this guess at the new value of the time of flight variable and have the navigational calculator recalculate the distance parameter. This process of guessing at the value of a flight variable that will result in the required distance being computed by the navigational calculator, entering the value into the navigational calculator, and recomputing the distance parameter continues until the navigational calculator computes the required desired distance or a distance that is close enough to the desired distance for the user's purposes. Obviously, this is a very time consuming and inefficient process.

Based on the foregoing, there is a need for a method of transferring information between a navigational calculator and a user via the input and output devices of the calculator that is more convenient and reliable than the methods employed in presently known navigational calculators. More specifically, there is a need for a navigational calculator where the user is not required to define the values of the variables required to compute a particular navigational parameter in a defined sequence. Additionally, a method for communicating information between a navigational calculator and a user is needed that allows the user to change the value of a variable that has been defined without having to redefine the values associated with other variables involved in the calculation of the navigational parameter. Additionally, there is a need for a method of transferring information between a navigational calculator and a user where the user is less susceptible to being mislead by having values from previous calculations being associated with the variables or selected navigational parameter of a current calculation. Moreover, there is a need for a method of operation of a navigational calculator where, for a desired navigational parameter calculation, only those variables that are necessary for carrying out the calculation are displayed on a multi-line output device. In addition, there is a need for a navigational calculator where the user is provided with information on the effect of changing the value of a previously calculated navigational parameter on the value of a variable used in the initial calculation of the navigational parameter.

SUMMARY OF THE INVENTION

The present invention provides a method for communicating information for making a navigational computation between a navigational calculator and a user via the input and output devices of the navigational calculator that is more convenient and reliable than the methods utilized in known navigational calculators. The method of the present invention includes the initial step of selecting a navigational parameter whose value is to be determined using the input device of the navigational calculator. The user then defines the values of the variables necessary to compute the selected navigational parameter in any order that is convenient. Once all of the variables have been defined, the navigational calculator computes the value of the selected navigational parameter and displays the value using its output device.

Preferably, the method also includes displaying on the output device of the navigational calculator only the variable abbreviations for which values must be defined by the user in order to compute the selected navigational parameter. Consequently, the user is not required to remember the variables associated with the computation of each navigational parameter that the navigational calculator is capable of computing. Furthermore, to avoid problems associated with using previously defined or determined values for the variables required to compute the selected navigational parameter, the values associated with the variables displayed o the output device of the navigational computer are initially cleared. Similarly, the selected flight parameter and any previously computed value for the selected flight parameter are not initially displayed following the selection of the navigational parameter to avoid confusing and/or misleading situations. In the preferred embodiment of the method, the user is also allowed to change or alter the value of any variable without having to reenter the values associated with the other variables involved in computing the selected navigational parameter.

The present invention also provides a method of communicating information for making a navigational computation between a navigational calculator and a user via the input and output devices of the navigational calculator where the user can change the value of a previously calculated navigational parameter using the input device of the navigational calculator and the navigational calculator will determine the effect on the value of a variable used in the initial calculation of the navigational parameter. For example, if the navigational calculator has previously calculated the distance that would be traveled by an airplane based on ground speed and time of flight information provided by the user, the present invention allows the user to change the value of the distance parameter calculated by the navigational calculator and determine the effect on the time of flight variable if the value of the ground speed variable remains the same as in the initial calculation. Alternatively, the navigational calculator could determine the effect of the change in value of the navigational parameter on the ground speed variable rather than the time of flight variable.

Based on the foregoing, the method of the present invention provides several advantages over the known methods of communicating information between a user and a navigational computer using the input and output devices associated with the navigational computer. Among the advantages, the method of the present invention allows the user, following the selection by the user of a navigational parameter, to enter the values of the variables necessary to compute the selected navigational parameter in any order that is convenient. Another distinct advantage of the present invention is that the user can change or modify the value of a variable without having to redefine the values associated with any other variables involved in the computation. Yet another advantage of the present invention is that the user is prompted only with the variables required to compute the selected navigational parameter to avoid confusing the user with variable mnemonics or abbreviations that are extraneous to the selected navigational parameter calculations and to relieve the user from having to remember the variables associated with the selected navigational parameter. Yet a further advantage of the present invention is that confusion associated with displaying values of the variables or the selected navigational parameter from previous calculations is substantially reduced by initially clearing the values associated with the variables and the selected navigational parameter as well as not initially displaying the selected parameter on the output device following the selection of the desired parameter. A further advantage of the present invention is that it is capable of providing information of the effect of changing the value of a previously calculated navigational parameter on the value of a variable used in the initial calculation of the navigational parameter.

DETAILED DESCRIPTION OF THE PREFERRED EMBODIMENT

The present invention provides a method of operation of a navigational calculator and, in particular, the method by which a navigational calculator communicates with a user during the computation of a navigational parameter. While the preferred embodiment of the invention described herein is directed to a flight calculator, the present invention is readily adapted to other types of navigational computers, such as computers for achieving nautical navigation.

Figure 1:
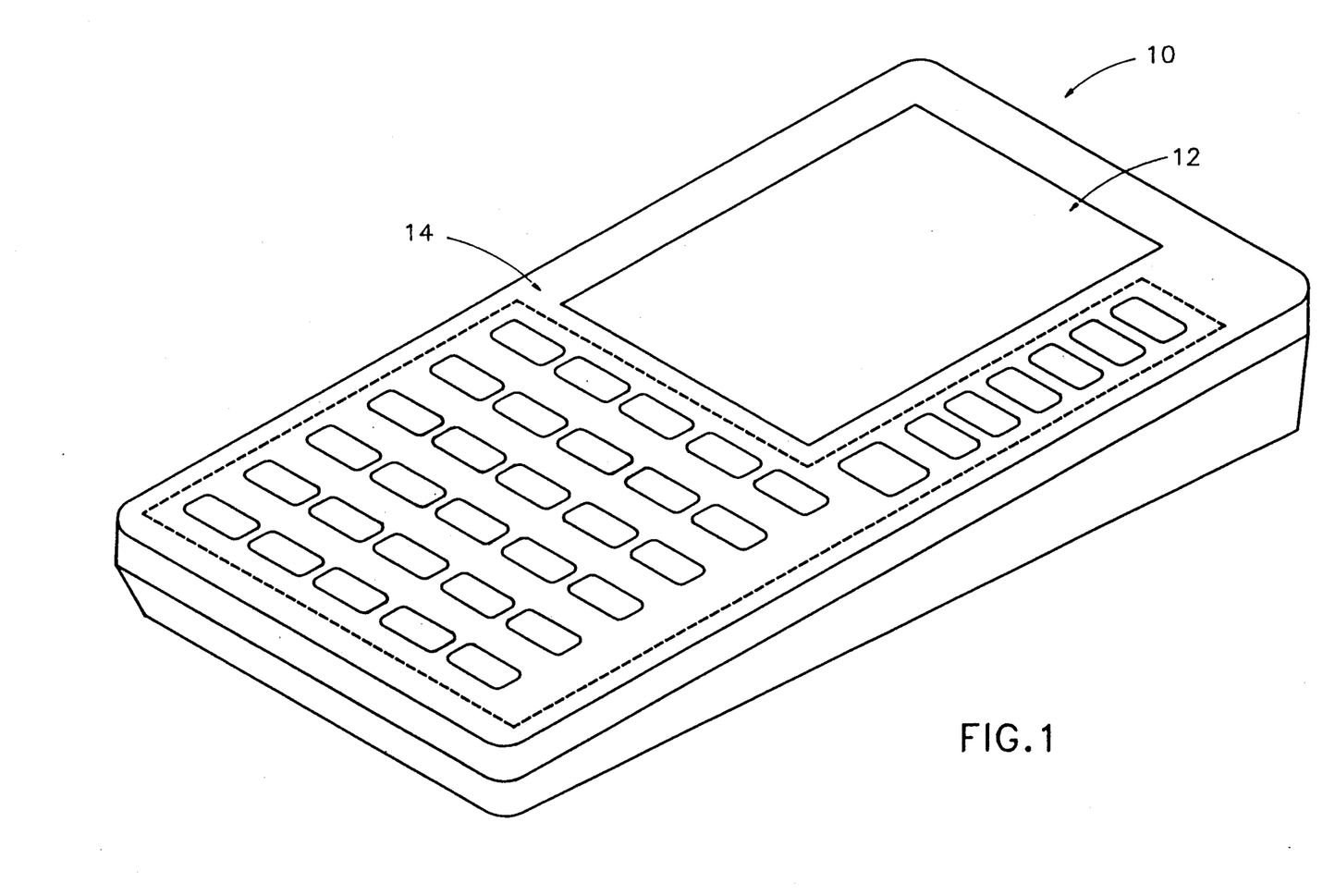
FIG. 1 illustrates a flight calculator having an LCD display for outputting information to a user and a keyboard that allows a user to input information to the flight calculator.
Figure 2:
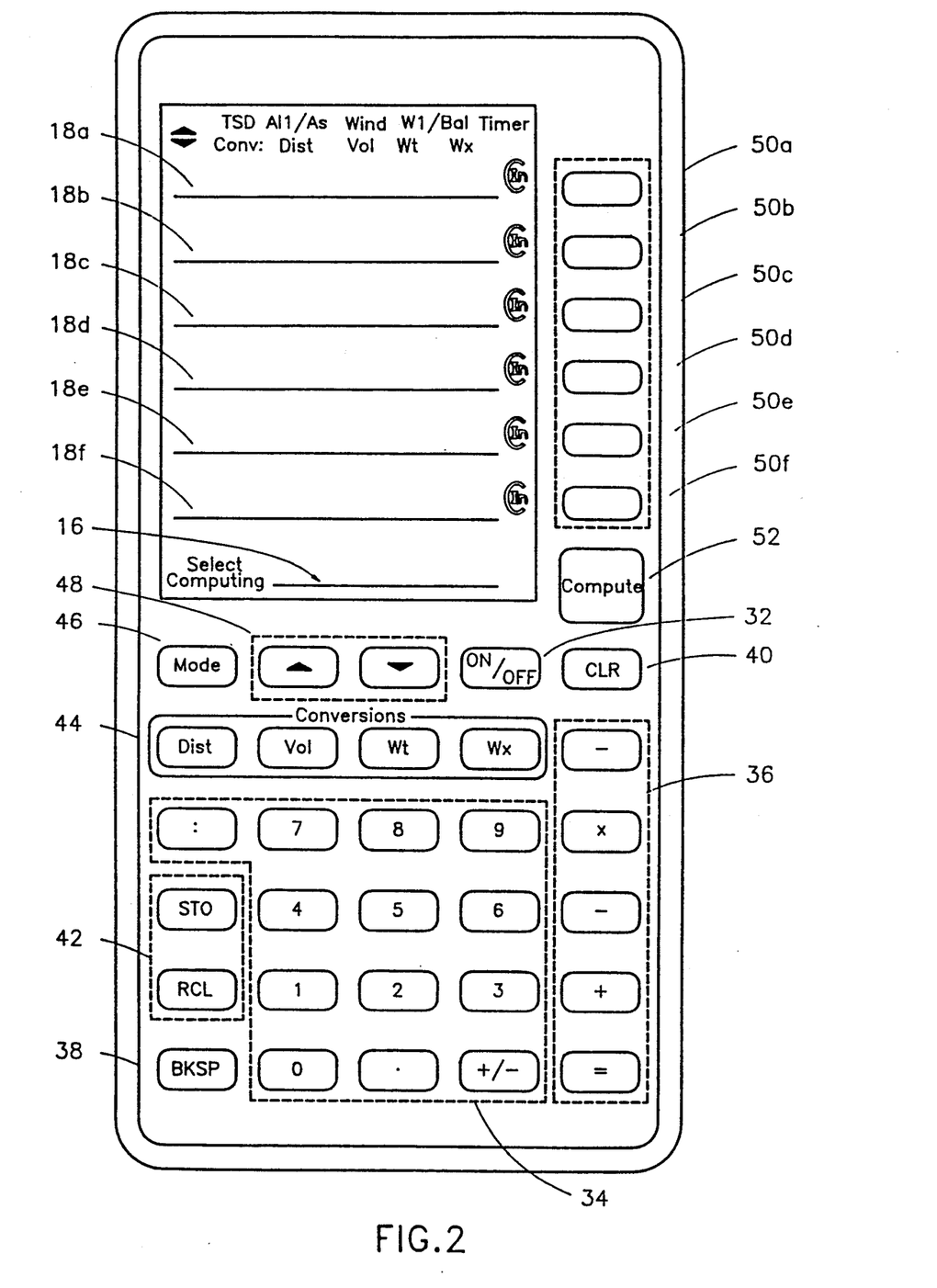
FIG. 2 shows the LCD display and keyboard of the flight calculator illustrated in FIG. 1 in greater detail.
Figure 3:
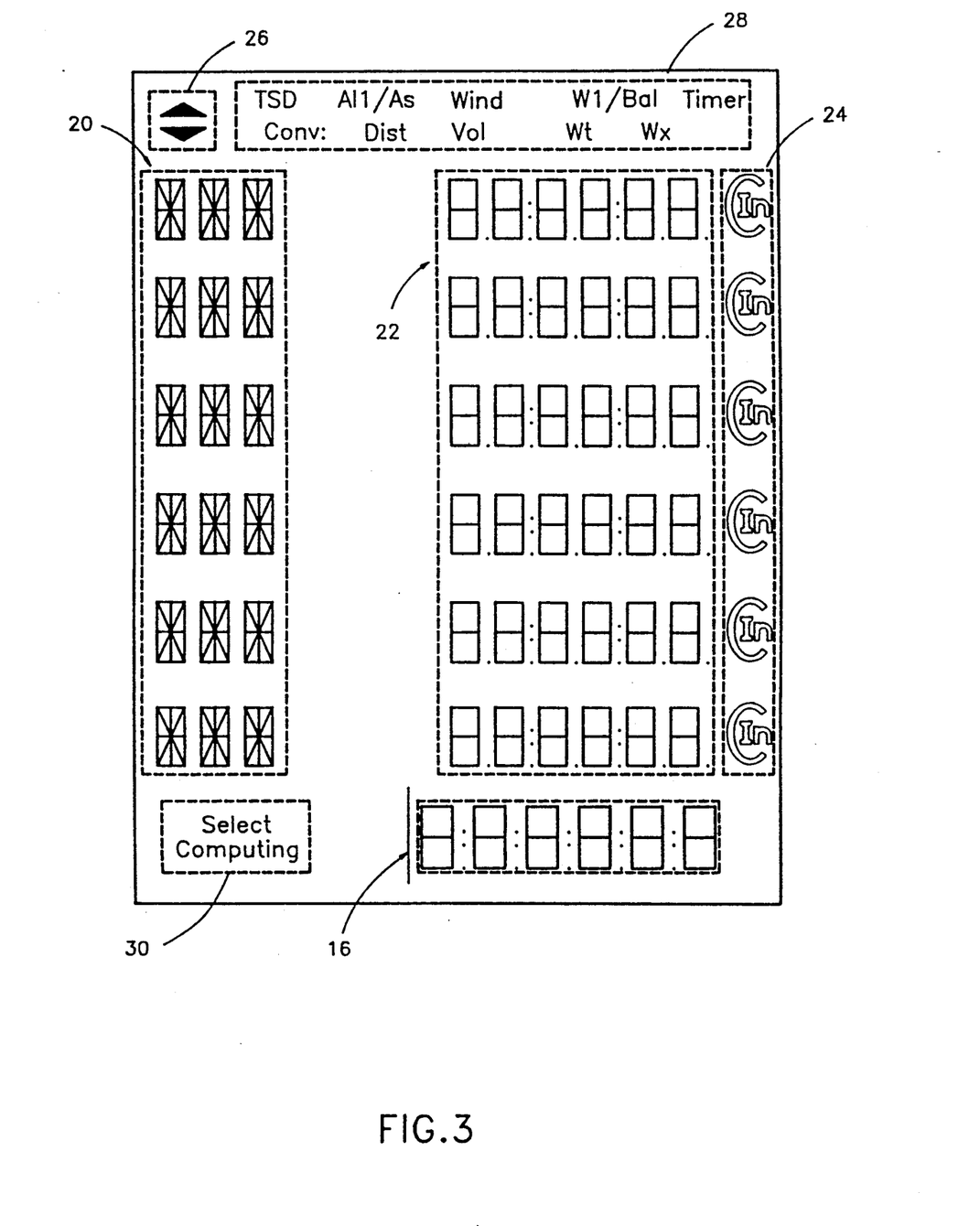
FIG. 3 the various fields associated with the LCD display of the flight calculator shown in FIGS. 1 and 2.

With references to FIGS. 1 through 3, a preferred embodiment of the invention is employed with a hand-held flight calculator 10, hereinafter calculator 10, that includes a liquid-crystal display (LCD) 12 for displaying various types of information to the user and a keyboard 14 for allowing the user to enter information into the hand-held flight calculator 10. The calculator 10 also includes a memory (not shown) for, among other things, storing a program that is used to implement the method of the present invention and a processor (not shown) for executing the program and, in so doing, causing output information to be displayed on the LCD display 12 and processing input information from the keyboard 14.

The LCD display 12 includes a scratch pad line 16 for displaying information that the user can change or alter by appropriate manipulation of the keyboard 14. The LCD display 12 also includes flight information lines 18a-f for displaying flight information that has been entered by the user or determined by the calculator 10. The flight calculator lines 18a-f are each divided into a mnemonic field 20 and a value field 22. The mnemonic field 20 is used to display an abbreviation of up to three characters that is indicative of the type of flight information being displayed on the flight information line with which it is associated. The value field 22 is used to display the value associated with the flight information identified by the abbreviation in the mnemonic field 20. Also associated with each of the flight information lines 18a-f is a status field 24 that is used to indicate whether the information contained in the value field 22 of the flight information line has been input to the calculator 10 by the user or determined by the calculator 10. If the information has been input to the calculator 10 by the user, then the "In" portion of the status field 24 is activated by the calculator. The "C" portion of the status field 24 is activated by the calculator 10 when the calculator 10 has determined the information contained in the value field 22. The LCD display 12 further includes a scroll field 26 that indicates whether information, in addition to that currently being display on the flight information lines 18a-f, exists and in which direction the information can be found by "scrolling" the flight information lines 18a-f using one of the keys on the keyboard 14. Also included in the LCD display 12 is a mode field 28 that is used to indicate the type of flight mode and/or conversion mode operation currently being performed by the calculator 10. Presently, the calculator 10 is capable of operating in the following flight modes: time-speed-distance (TSD) mode, altitude/airspeed (ALT/AS) mode, wind mode, weight and balance (WT/BAL) mode, and a timer mode. Presently, when the calculator 10 is in the conversion mode, conversions of distance (DIST), volume (VOL), weight (WT), and meteorological (WX) values from at least one unit of measure to another unit of measure are supported by the calculator 10. The LCD display 12 also includes a select/computing field 30 that prompts the user to select one of the choices being displayed in the flight information lines 18a-f by activating the "select" portion of the select/computing field 30 or indicates to the user that the calculator 10 is in the process of computing the value of a flight parameter by the user by activating the "computing" portion of the select/computing field 30.

The keyboard 14 includes an on/off key 32 for causing power to be applied or removed from the calculator 10. Also included in the keyboard 14 are the numeric keys 34 for entering information into the calculator 10. The numeric keys 34 include a separate key for each of the numbers "0" through "9", a decimal point key, a "+/−" key, and a colon key for use in entering time related information. Typically, the calculator 10 causes information entered by the numeric keys 34 to be displayed on the scratch pad line 16. The keyboard 14 further includes mathematical function keys 36 for defining the mathematical operations to be performed by the calculator 10 on the information that is currently being displayed on the scratch pad line 16. A back space key 38 and a clear key 40 are included in the keyboard 14 for editing the information currently being displayed on the scratch pad line 16. Memory keys 42 are also included in the keyboard 14 for use in storing information shown in the scratch pad line 16 in the memory of the calculator 10 or recalling information previously stored in the memory of the calculator 10 for display on the scratch pad line 16. Also included in the keyboard 14 are conversion keys 44 for initiating distance, volume, weight, or meteorological conversions of a value from one unit of measure to at least one other unit of measure. A mode key 46 is provided in the keyboard 14 for allowing a user to select the TSD, ALT/AS, WIND, WT/BAL, or TIMER modes of operation of the calculator 10. Scroll keys 48 are provided in the keyboard 14 for allowing the user to scroll the information displayed in the flight information lines 18a-f in accordance with the information provided in the scroll field 26. The keyboard 14 further includes flight information entry keys 50a-f for, among other things, moving a value from the scratch pad line 16 to the mnemonic field 22 of a flight information line 18a-f and thereby associating the value with type of flight information identified by the abbreviation in the mnemonic field 20 of the particular flight information line 18a-f. The keyboard also includes a compute key 52 that, if the necessary information has been entered into the calculator 10, causes the calculator to perform a flight calculation and display the result on the appropriate flight information line 18a-f.

Figure 4:
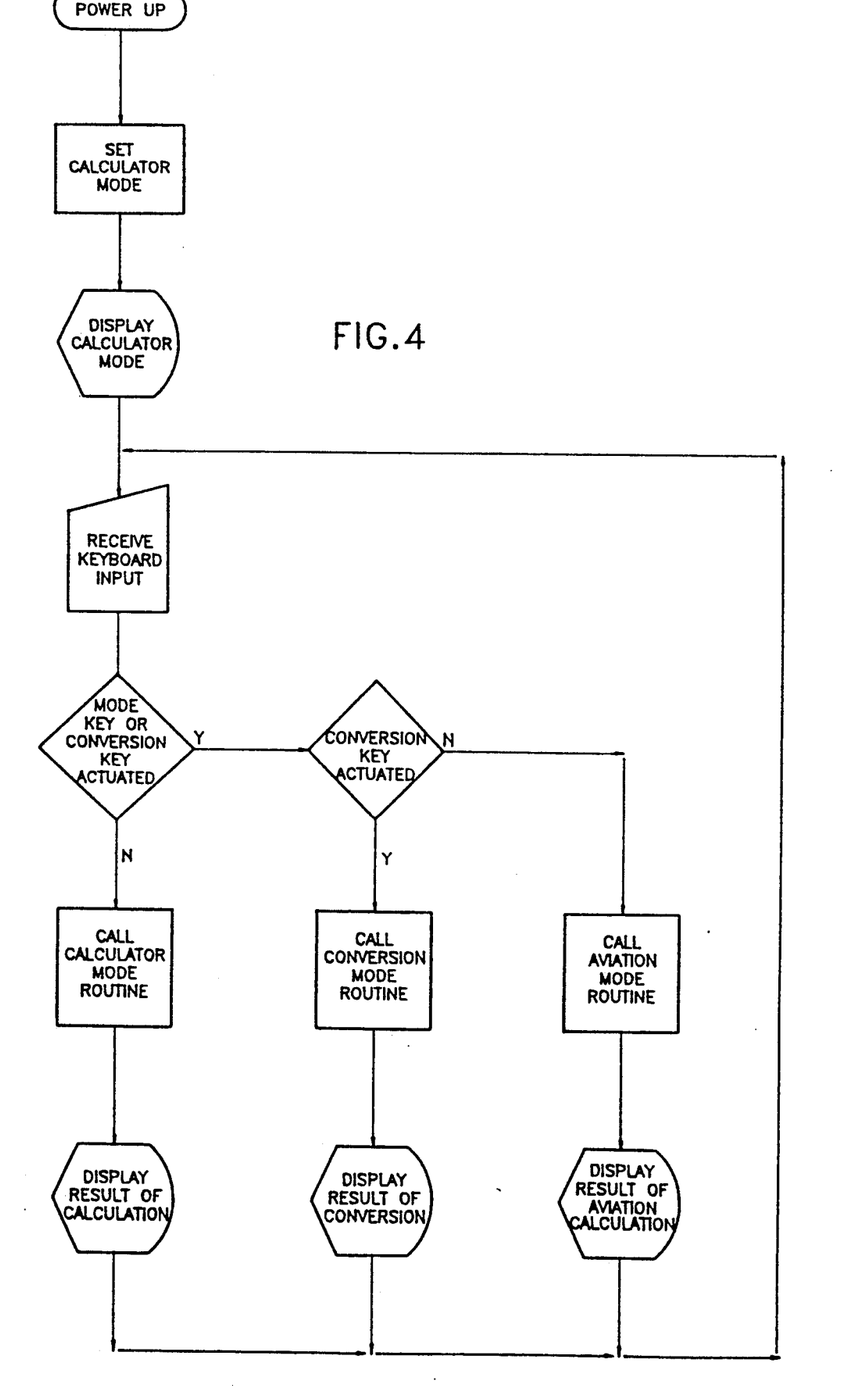
FIG. 4 is a flow chart of the method in which the flight calculator interacts with a user via the LCD display and keyboard immediately following power up of the flight calculator.

Before discussing in detail the method by which the calculator 10 and a user interface during a flight calculation, it is necessary to first discuss the basic modes of operation of the calculator 10 and the ways in which a user can enter information into the calculator when the calculator is in one of these modes. The calculator 10 operates in three basic modes, a calculator mode, an aviation mode, and a conversion mode. In the calculator mode, the calculator 10 operates in substantially the same manner as a traditional calculator. More specifically, operands are entered into the calculator 10 by manipulation of the numeric keys 34. The calculator 10, in turn, causes the operands to be displayed on the scratch pad line 16. Alternatively, operands that have been previously stored in the memory of the calculator 10 can be retrieved using the appropriate one of the memory keys 42 and displayed in the scratch pad line 16. Once an operand has been entered into the calculator 10, the operand can be edited using the back space key 38 or the clear key 40. Operators are entered into the calculator 10 by manipulation of the mathematical function keys 36 and processed by the calculator 10 with the result, if necessary, displayed on the scratch pad line 16. In addition, any operand or result of an operation can be stored in the memory of the calculator 10 using the memory keys 42. With reference to FIG. 4, the calculator mode is entered when the calculator 10 is powered up following actuation of the on/off key 32 and remains in effect until either one of the conversion keys 44 or the mode key 46 is actuated to place the calculator 10 either in the aviation mode or the conversion mode, respectively.

In the aviation mode, the calculator 10 operates as a flight calculator as well as a traditional calculator. Since the calculator 10 is capable of operating as a traditional calculator or a flight calculator when in the aviation mode, the preferred embodiment of the calculator 10 has no provision for returning to the calculator mode once the aviation mode is entered. The information necessary to perform a flight calculation can be entered into the calculator 10 in several ways. For instance, data can be entered by manipulation of the numeric keys 34 or by recalling a value stored in memory using the appropriate one of the memory keys 42. Once data has been entered in the calculator 10 using the numeric keys 34 or the appropriate one of the memory keys 42, the data can be manipulated using the mathematical function keys. Data can also be manipulated by actuating one of the conversion keys 44 to place the calculator 10 in the conversion mode. In the conversion mode, data that has been entered into the calculator 10 is converted from one unit of measure to another unit of measure by the calculator 10 and then displayed on one of the flight information lines 18a-f. Moreover, any combination of the aforementioned ways for entering data into the calculator 10 or manipulating data in the calculator 10 during the aviation mode can be employed. For instance, the user can recall a value from memory using the appropriate one of the memory keys 42, perform an operation on the recalled value using the numeric keys 34 and/or the mathematical function keys 36, and convert the result of the mathematical operation from one unit of measure to another unit of measure using the conversion keys 44. As with the calculator mode, the back o space key 38 and the clear key 40 can be used to edit any data that is entered into the calculator 10 and displayed in the scratch pad line 16.

The conversion mode of operation, as previously mentioned, is initiated by actuation of one of the conversion keys 44 and is used to convert a value from one unit of measure to one or more other units of measure. For example, a measurement expressed in feet can be converted to an equivalent measurement in meters or kilometers. The conversion mode, in addition to being a basic mode of operation for the calculator, can be accessed when the calculator is in the calculator mode or the aviation mode.

Figure 5A:
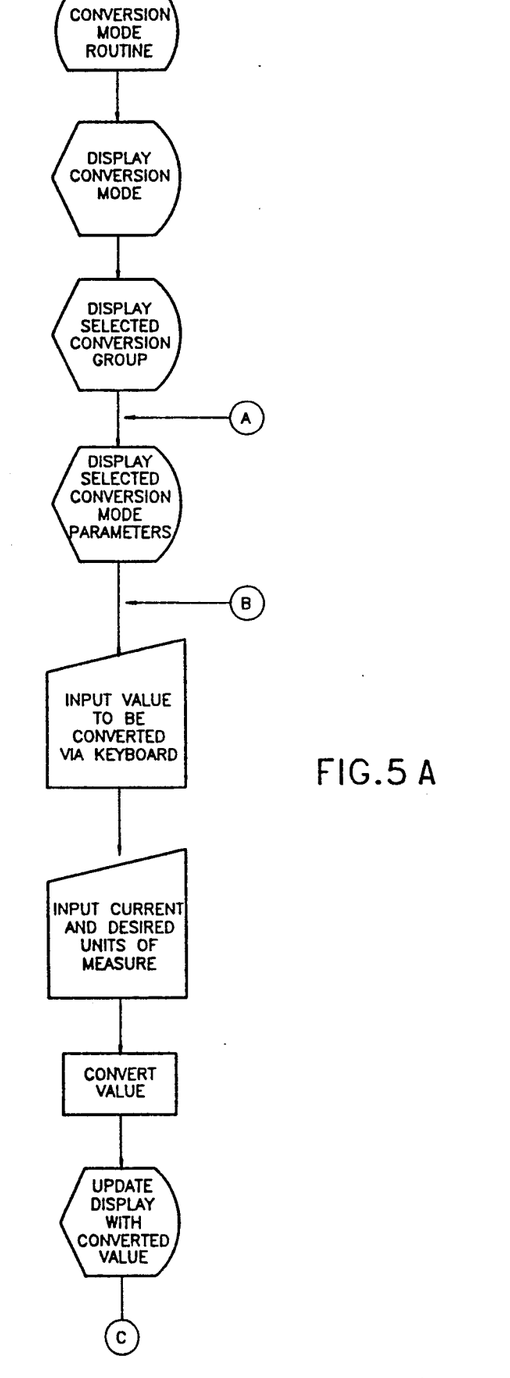
FIGS. 5a-b are flow charts of the method by which the flight calculator interacts with a user via the LCD display and keyboard when converting the value of a variable or a flight parameter from one unit of measure to another unit of measure.
Figure 5B:
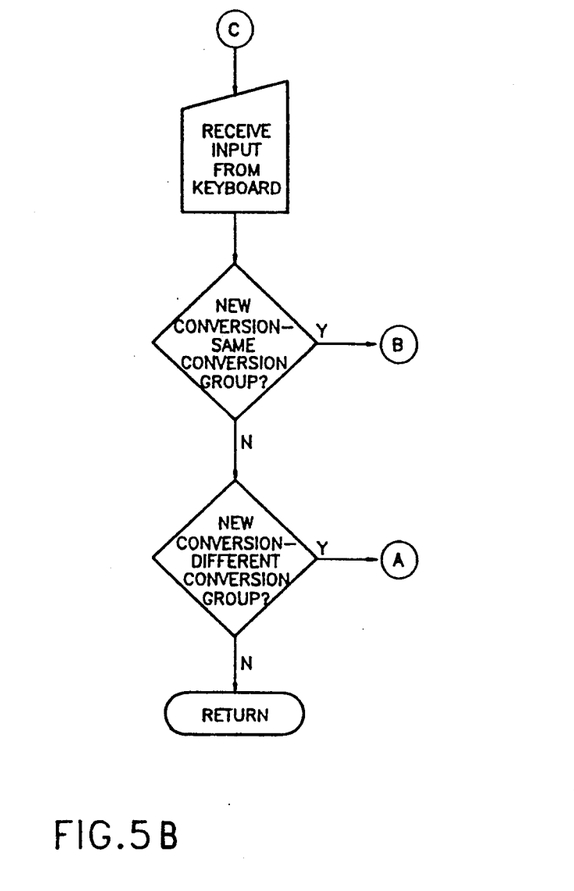
Figure 6A:
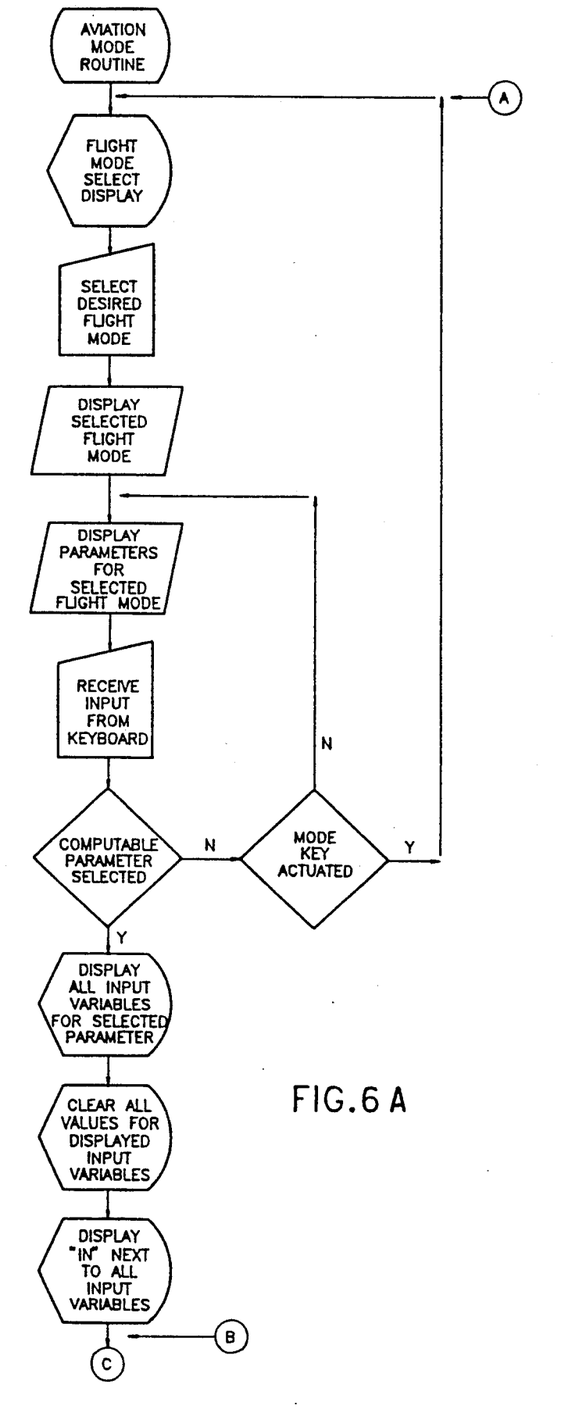
FIGS. 6a-b is a flow chart of the method in which the flight calculator interacts with a user via the LCD display and keyboard when calculating a flight parameter.
Figure 6B:
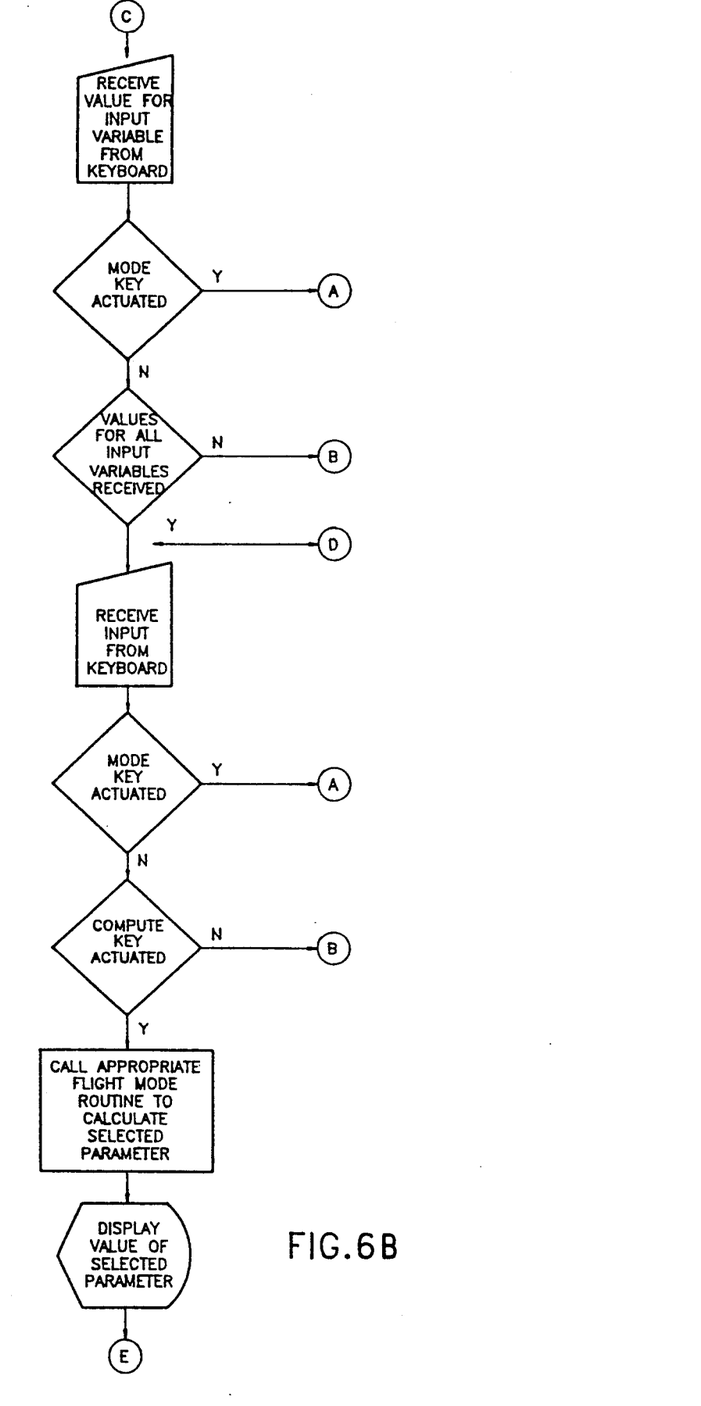
Figure 6C:
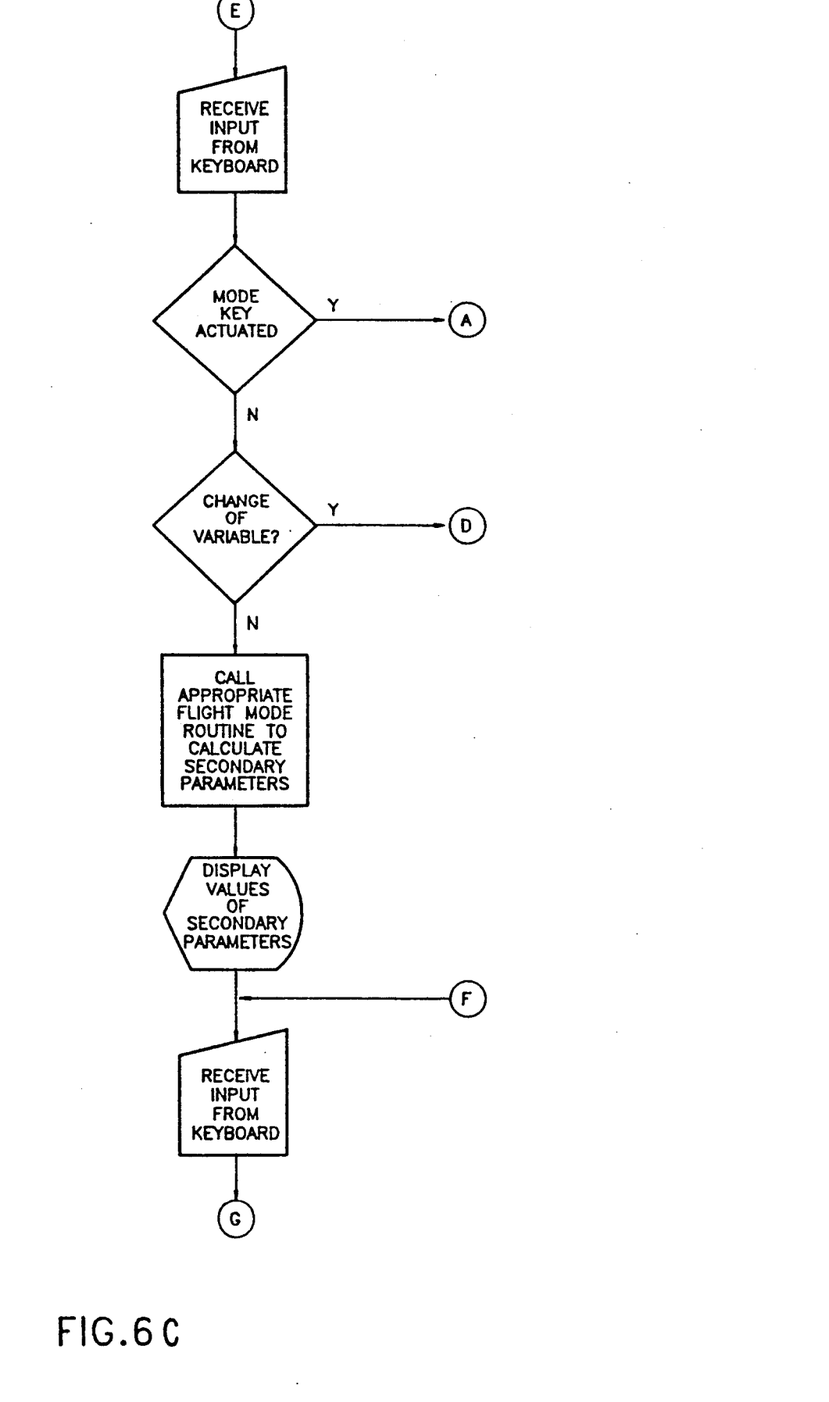
Figure 6D:
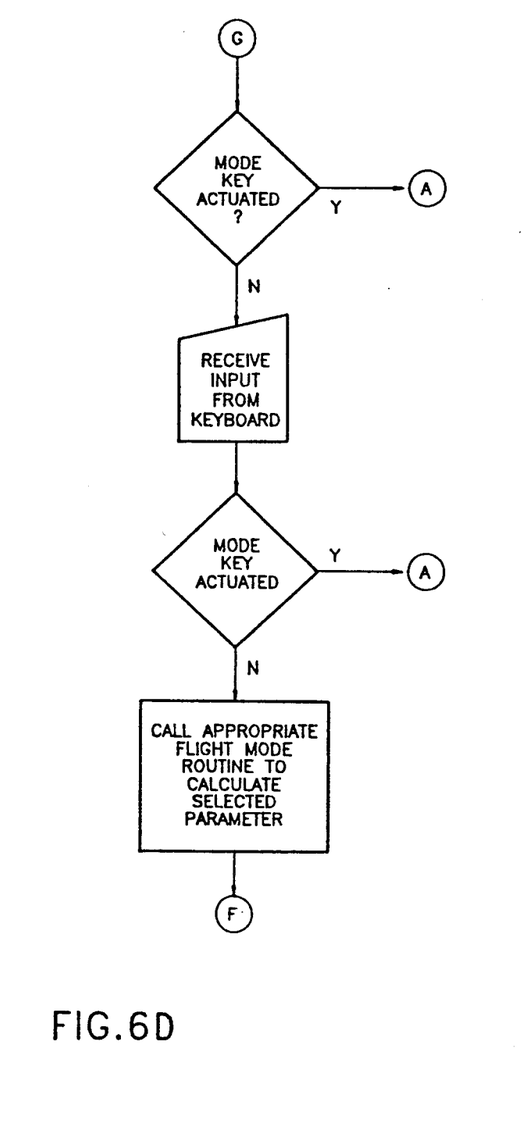

With reference to FIGS. 4–6, the method in which the calculator 10 interfaces with the user by the LCD display 12 and the keyboard 14 during operation of the calculator 10 is described. As shown in FIG. 4, the calculator 10 enters the calculator mode upon being powered up by actuation of the on/off key 32. The calculator 10 indicates that it is in the calculator mode by clearing the mode field 2B. The calculator 10 then waits for the use to enter data using the keyboard 14. If the user actuates the mode key 46, then the calculator enters the aviation mode. If, however, the user actuates one of the numeric keys 34, the mathematical function keys 36, the back space key 38, the clear key 40, or the memory keys 42, then the calculator 10 remains in the calculator mode and performs the required operation. When the calculator 10 is in the calculator mode, the scroll keys 48, the flight information enter keys 50a through 50f, and the compute key 52 are of no use and, as a consequence, are disabled. Consequently, if the user actuates one of these keys, the calculator 10 either ignores it or displays an error message on the scratch pad line 16. If, instead of actuating the mode key 46 or one of the keys associated with the calculator mode of operation, one of the conversion keys 44 is actuated by the user, the calculator 10 enters the conversion mode where a conversion routine is called to perform the needed conversion operation. As previously mentioned, the conversion mode can also be accessed when the calculator 10 is in either the calculator mode or the aviation mode, i.e., executing the calculator mode routine or the aviation mode routine.

With reference to FIGS. 5a-b, the conversion mode routine is illustrated. Basically, the conversion mode routine activates the "conv" portion of the mode field 28 to indicate that the conversion mode is in effect. In addition, the conversion mode routine causes the portion of the mode field 28 representative of the selected conversion group to be activated. For example, if the user has selected the weight conversion group, the conversion mode routine activates the "WT" portion of the mode field 28. Following activation of the "conv" and the selected conversion group of the mode field 28, the conversion mode routine causes the conversion mode parameters for the type of conversion that has been selected by the user's actuation of one of the conversion keys 44 to be displayed. For example, if the weight conversion has been selected by the user, then a pound mnemonic "LB" and a kilogram mnemonic "KG" are displayed on the flight information lines 18a and 18b, respectively. The user then inputs the value that is to be converted from one unit of measure to another unit of measure into the calculator 10. The calculator 10, in turn, displays the information on the scratch pad line 16. The user then identifies the present unit of measure of the value displayed in the scratch pad line 16 by actuating one of the flight information entry lines 50a-f. For example, if the user desires to convert pounds to kilograms, the flight information entry line associated with the pound mnemonic "LB" is actuated. In response, the calculator 10 causes the value on the scratch pad line 16 to be moved to the value field 22 of the appropriate flight information line 18a-f and the "IN" portion of the corresponding status field 24 to be activated. Following entry of the value to be converted and the identification of the current unit of measure associated with the value, the user identifies the unit of measure to which the value is to be converted and initiates the conversion. In the case of the conversion of data from pounds to kilograms, the user actuates the compute key 52 and the flight information entry key 50a-f associated with the desired unit of measure to which the value is to be converted, in this case the flight information entry key associated with the kilogram mnemonic "KG". The calculator 10 then computes the required conversion and displays the converted value on the appropriate flight information line 18a-f with the "C" portion of status field 24 activated. During the computation, the calculator 10 activates the "computing" portion of the select/computing field 30. At this point, conversion to other available units of measure for the selected conversion group can be achieved simply be actuating the compute key 52 for a second time and the flight information entry key 50a-f associated with the desired unit of measure. This sequence can be repeated until the initial value has been converted into all available units of measure for the selected conversion group. Following a conversion, the user can also select a different conversion group from that initially selected and have the calculator perform further conversions. If the user desires to retain one of the values computed during execution of the conversion mode routine and shown on one of the flight information lines 18a-f, the user can move the value shown in one of the flight information lines 18a-f to the scratch pad line 16 by actuating the recall key of the memory keys 42 and the flight information entry key 50a-f associated with the flight information line 18a-f on which the value is displayed. The information on the scratch pad line 16 can then be stored in the memory of the calculator by actuation of the appropriate one of the memory keys 42. Termination of the conversion mode routine is accomplished by the user actuating a key that is incompatible with remaining in the conversion mode. For example, if the conversion mode was entered from the calculator mode, the actuation of one of the mathematical function keys causes control to return to the calculation mode routine with whatever information was displayed in the flight information lines 18a-f during the conversion mode being retained in the flight information lines 18a-f. If, on the other hand, the user entered the conversion mode from the aviation mode, then return to the aviation mode can be achieved following a conversion by actuating the mode key 46. Upon return to the aviation mode, the desired information is displayed on the scratch pad line 16.

With reference to FIGS. 6a-d the method in which the calculator 10 interfaces with a user when the calculator 10 is in the aviation mode is illustrated. The aviation mode is entered, as previously discussed with respect to FIG. 4, when the mode key 46 is actuated by the user. Upon actuation of the mode key 46, the calculator 10 causes the five types of flight calculations that the calculator 10 can compute to be displayed in the mnemonic field 20 of the flight information lines 18a-e. Presently, the five types of flight calculations, hereinafter referred to as flight modes, that the calculator can compute are the time-speed-distance (TSD) mode, altitude/air speed (ALT) mode, wind (WND) mode, weight/balance (W/B) mode, and timer (TMR) mode. At this point, the calculator 10 also causes the "select" portion of the select/computing field 30 to flash "on" and "off" to indicate that the user must now select one of the displayed flight modes. The user selects one of the flight modes by actuating the flight information entry key 50a-e associated with the flight information line 18a-e on which the abbreviation associated with the desired flight mode is displayed. Actuation of other keys is ignored by the calculator 10 at this point. Once a flight mode has been selected, the calculator 10 activates the appropriate portion of the mode field 28 to indicate the selected flight mode. For example, if the user selects the TSD mode, the calculator 10 causes the "TSD" portion of the mode field 28 to be activated. The calculator also causes, at this point, the mnemonics associated with the parameters of the selected flight mode to be displayed in the mnemonic fields 20 of the flight information lines 18a-f.

At this point the calculator 10 causes the "select" portion of the select/computing field 30 to be activated and waits for the user to actuate one of the keys on the keyboard 14. If the user actuates the mode key 46, then the calculator 10 clears the mode field 28 and simultaneously displays all of the abbreviations associated with the various flight modes in the mnemonic field 28 of the flight information lines 18a-f and the user selects the desired flight mode by actuating the appropriate flight information entry key 50a-f. In other words, if the user actuates the mode key 46, the process of calculating a flight parameter begins anew. If, on the other hand, the flight information entry key 50a-f that is associated with a computable parameter for the selected flight mode is actuated, then the calculator 10 causes the abbreviations associated with all of the input variables necessary to calculate the selected parameter to be displayed in the mnemonic fields 20 of the flight information lines 18a-f. Notably, any abbreviations associated with variables that are not necessary to calculate the selected parameter are not displayed on the LCD display 12. Presently, the navigational calculations that the calculator 10 is capable of performing have no more than five input variables. Consequently, all of the abbreviations associated with the input variables of the selected parameter are displayed simultaneously. The mnemonic associated with the selected parameter is, however, removed from the LCD display 12 at this point. Moreover, the calculator 10 causes the value fields 22 of all of the flight information lines 18a-f to be cleared and the "IN" indicator in the status field 24 to be activated for all of the variables. In addition, the calculator 110 clears any value associated with the selected parameter that may exist from a previous calculation. Consequently, at this point, the flight information lines 18a-e are displaying and, in effect, prompting the user for the information that is necessary to calculate the selected parameter. If the user does not select a computable parameter by actuation of a flight information entry key 50a-f or begin the calculation process anew by actuation of the mode key 46, then the calculator 10 either ignores the key and continues to wait for the user to actuate either the mode key 46 or a flight information entry key 50a-f associated with a selectable parameter, or displays an error message in the scratch pad line 16 indicating that the key actuated by the user is invalid at this point in the process.

If the user has selected a parameter, then user can now proceed to define the values associated with the variables whose abbreviations are displayed in the mnemonic fields 20 in any order that is convenient. However, if the mode key 46 is actuated before the values for all of the variables have been defined the flight calculation process starts over. The user defines the value of a variable by initially entering information into the scratch pad line 16 using either the numeric keys 34 or recalling a value from memory using the appropriate one of the memory keys 42. As previously mentioned, the value displayed in the scratch pad line 16 can be operated on using the mathematical function keys 36 and/or the conversion keys 44 as well as edited by using the backspace key 38 and/or the clear key 40 until the desired value is displayed in the scratch pad line 16. Once the desired value for a variable is displayed in the scratch pad line 16, the user can associate the value with a particular variable by actuating the flight information enter key 50a-f associated with the flight information line 18a-f on which the abbreviation for the variable is displayed in the mnemonic field 20. This results in the value being moved from the scratch pad line 16 to the value field 22 of the appropriate flight information line 18a-f. Advantageously, the user can define the values associated with the variables in any order that is convenient. Moreover, even if the user has associated a value with a particular variable by establishing the value in the value field 22 of one of the flight information lines 18a-f, the user can change the value associated with the variable by simply entering the desired value in the scratch pad line 16 and actuating the appropriate flight information entry key 50a-f as previously discussed. The process of defining the values of the input variables continues until all of the input variables necessary to compute the selected parameter have been defined to the user's satisfaction, as indicated by the user activating the compute key 52, or the mode key is actuated by the user. If the compute key 52 is actuated when the values of less than all of the variables necessary to calculate the selected navigational parameter have been defined, the calculator 10 causes an error message to be displayed in the scratch pad line 16 and an "E" to be placed in the value field 22 of the flight calculator line or lines 18a-f associated with the variable or variables whose values have not yet been defined.

Once all of the values of the variables have been defined, the calculator 10 again awaits the user's input from the keyboard 14. In contrast to the point in the process where less than all of the values of the variables have been defined, the calculator 10 will now process an actuation of the compute key 52. If, however, the mode key 46 is actuated by the user, then the calculator 10 causes the process of computing flight parameter to start over as previously discussed. If the compute key 52 is actuated, the calculator 10 calls the appropriate flight mode routine to determine the value of the selected parameter based upon the values of the variables defined by the user. Once the value of the selected parameter has been computed, the calculator 10 displays the abbreviation associated with the selected parameter in the mnemonic field 20 associated with the next available flight information line 18b-f in the display 12 together with the calculated value of the selected parameter in the value field 22. Consequently, at this point, the value of the selected parameter and the values of the variables together with their mnemonic abbreviations are simultaneously displayed in the flight information lines 18a-f. This allows the user to verify the data upon which the calculation was made. The calculator 10 also indicates that the value of the parameter has been computed, rather than input by the user, by activating the "C" display in the status field 24. If neither the mode key 46 nor the compute key 52 is actuated by the user, then the user is either conducting a calculation on the scratch pad line 16, which may or may not result in the value associated with one of the, variables being redefined, or the user has actuated a key which is disabled and not being processed by the calculator 10 at this point. In either case, the calculator 10 takes the appropriate action and continues to process the user's input from the keyboard 14.

Once the calculator 10 has made the initial calculation of a selected flight parameter and displayed t he calculated value for the selected flight parameter, it again awaits input from the user via the keyboard 14. As before, the user can actuate the mode key 46 to cause the calculator 10 to restart the process of performing a flight calculation. The user can also change the values associated with one or more of the variables and recalculate the value of the selected parameter by actuation of the compute key 52. If, instead, the user actuates the compute key 52 a second time without having changed the value of one of the variables or actuated the mode key 46 since the first time the compute key 52 was actuated, then the calculator 10 calls the flight mode routine to calculate any other parameters, hereinafter referred to as secondary parameters, that can be determined based on the values of the variables that are currently defined and the value of the selected parameter. Once the secondary parameters have been determined, they are displayed on the next available flight information line 18c-f or, if necessary, are placed on a secondary screen that can be accessed using the scroll keys 48.

Following computation of the values of the secondary parameters, the calculator 10 again awaits the user's input from the keyboard 14. As before, if the user actuates the mode key 46, the process of calculating a flight parameter begins anew. If the user does not actuate the mode key 46, then the user has input information into the scratch pad line 16, which may or may not be used to redefine the value of a variable or a previously calculated parameter, or actuated a key that is disabled at this point. If the value of a variable or a previously calculated parameter is changed by the user, then the changed value is displayed on the appropriate flight information line 18a-f. If, on the other hand, the user activates a key that is disabled, the calculator 10 either ignores the actuated key or displays an appropriate error message on the scratch pad line 16.

At this point the calculator 10 again awaits further input from the keyboard 14 by the user. As before, if the user actuates the mode key 46, the process if determining a flight parameter begins anew. If, however, the user has altered the value of a variable or the previously calculated flight parameter and now actuates the compute key 52 followed by the flight information entry key 50a-f associated with the variables or previously calculated parameter, then the effect of having, by the previous step, changed the value of one of the variables or previously calculated parameters can be determined. For example, if the user has previously used the calculator to determine the distance that the aircraft will cover based on a particular time of flight and ground speed, the user can now change the distance and determine the effect on the time of flight if the current ground speed is maintained. The determination of the variable or previously calculated parameter selected by the user's actuation of one of the flight information entry key 50a-f, of course, depends upon there being sufficient information in the form of previously defined variables or previously calculated parameters to make the requested calculation. Following the calculation of the identified parameter, the user can activate the compute key 52 a second time to determine the values of any secondary parameters that can be calculated based on the present information available to the calculator 10.

The foregoing description of the invention has been presented for purposes of illustration and description. Further, the description is not intended to limit the invention to the form disclosed herein. Consequently, variations and modifications commensurate with the above teachings, and the skill or knowledge in the relevant art are within the scope of the present invention. The preferred embodiment described hereinabove is further intended to explain the best mode known or practicing the invention and to enable others skilled in the art to utilize the invention in various embodiments with the various modifications required by their particular applications or uses of the invention. It is intended that the appended claims be construed to include alternate embodiments to the extent permitted by the prior art.

What is claimed is:

1. A method of operation of a navigational calculator having an input device for use in entering navigational information that is required to make a navigational calculation and an output device for use in displaying flight information, comprising:

selecting a navigational parameter that can be calculated by the navigational calculator using the input device, wherein said navigational parameter requires that the values of a plurality of variables be defined before said navigational parameter can be calculated;

associating, following said step of selecting, a previously entered value with each of said plurality of variables in any order that is convenient using the input device;

calculating the value of said navigational parameter using the values of said plurality of variables, and displaying the value of said navigational parameter using the output device.

2. A method, as claimed in claim 1, wherein:
said step of selecting includes displaying at least one navigational parameter using the output device.

3. A method, as claimed in claim 1, wherein:
said step of selecting includes displaying said plurality of variables without displaying variables that are unnecessary to the calculation of said navigational parameter.

4. A method, as claimed in claim 1, wherein
said step of selecting includes clearing any values previously associated with said navigational parameter.

5. A method, as claimed in claim 1, wherein:
said step of selecting includes clearing any values previously associated with each of said plurality of variables.

6. A method, as claimed in claim 1, wherein:
said step of selecting includes displaying the value associated with said navigational parameter, wherein said value is cleared.

7. A method, as claimed in claim 1, wherein:
said step of selecting includes displaying the values associated with each of said plurality of variables, wherein said values are cleared.

8. A method, as claimed in claim 1, wherein:
said step of selecting includes displaying said plurality of variables using the output device without displaying said navigational parameter.

9. A method, as claimed in claim 1, wherein:
said step of selecting includes simultaneously displaying all of said plurality of variables.

10. A method, as claimed in claim 1, wherein:
said step of selecting includes simultaneously displaying all of said plurality of variables without displaying said navigational parameter.

11. A method, as claimed in claim 1, wherein:
said step of selecting includes indicating, using the display, that information must be input for each of said plurality of variables.

12. A method, as claimed in claim 1, wherein:
said step of associating includes allowing the value of each of said plurality of variables to be altered until the desired value is associated with each variable.

13. A method, as claimed in claim 12, wherein:
said step of allowing includes indicating when the value of each of said plurality of input variables is the desired value.

14. A method, as claimed in claim 1, wherein:
said step of associating includes converting the value of at least one of said plurality of variables from a first unit of measurement to a second unit of measurement.

15. A method, as claimed in claim 1, wherein:
said step of associating includes recalling, with a recall key, a number from a memory associated with the navigational calculator.

16. A method, as claimed in claim 1, wherein:

said step of calculating includes calculating other navigational parameters using at least one of the following: the value of one of said plurality of variables and the value of said navigational parameter.

17. A method, as claimed in claim 1, wherein:
said step of displaying includes displaying said navigational parameter with the value of said navigational parameter.

18. A method, as claimed in claim 1, wherein:
said step of displaying includes displaying said plurality of variables and the values associated with each of said plurality of variables.

19. A method, as claimed in claim 1, wherein:
said step of displaying includes simultaneously displaying said plurality of variables and the values associated with each of said plurality of variables.

20. A method, as claimed in claim 1, wherein:
said step of displaying includes simultaneously displaying said plurality of variables, the values associated with each of said plurality of variables, and said navigational parameter with the value of said navigational parameter.

21. A method, as claimed in claim 1, wherein:
said step of displaying includes indicating, using the display, that said navigational parameter has been computed.

22. A method, as claimed in claim 1, further including:
redefining the value of at least one of said plurality of variables following said step of calculating and recalculating said navigational parameter.

23. A method, as claimed in claim 1, further including:
changing the value of said navigational parameter following said step of calculating and calculating the effect of the change in value of said navigational parameter on the value of a selected one of said plurality of variables.

24. A method of operating a navigational calculator having an input device for use in entering navigational information that is required to make a navigational calculation and an output device for use in displaying navigational information, comprising:
providing the values of a plurality of variables using the input device;
first calculating the value of a navigational parameter using the values of said plurality of variables;
changing the value of said navigational parameter determined in said step of calculating using the input device;
identifying a selected variable of said plurality of variables used to calculate said navigational parameter;
second calculating the effect of the change in value of said navigational parameter on the value of said selected variable of said plurality of variables using the values of said plurality of variables used in said step of first calculating, except for the value of said selected variables, and using the value of said navigational parameter determined in said step of first calculating; and
displaying the value of said selected variable calculated in said step of second calculating using the output device.

25. A method, as claimed in claim 24, wherein:
said step of providing includes providing the values of said plurality of variables in any order that is convenient.

26. A method, as claimed in claim 24, wherein:
said step of displaying includes displaying said navigational parameter, the value of said navigational parameter, the plurality of variables, and the values of said plurality of variables.

27. A method of operating a navigational calculator having an input device for use in entering navigational information that is required to make a navigational calculation and an output device for use in displaying navigational information, comprising;
displaying a plurality of navigational parameters associated with the selected mode using the output device;
selecting one of said plurality of navigational parameters to be calculated by the navigational calculator using the input device;
replacing the display of said plurality of navigational parameters with a display of all of the variables that are required to calculate the selected navigational parameter and the values associated with the variables using the output device, wherein the values are cleared;
associating, following said step of replacing, a previously entered value with each of said plurality of variables in any order that is convenient using the input device;
first calculating the value of said navigational parameter using the values of said plurality of variables;
displaying the variables, the flight parameter, and the values associated with each of the variables and the flight parameter using the output device;
changing the value of said navigational parameter determined in said step of calculating using the input device;
identifying a selected variable of said plurality of variables;
second calculating the effect on the value of said selected variable of said plurality of variables resulting from the change in value of said navigational parameter using the values of said plurality of variables used in said step of first calculating, except for the value of said selected variable, and using the value of said navigational parameter determined in said step of first calculating; and
displaying the value of said one of said plurality of variables.

28. A method, as claimed in claim 1, wherein:
said step of associating includes inputting, following the associating of values with all of said plurality of variables a compute signal, using the input device, that initiates said step of calculating.

29. A method, as claimed in claim 1, wherein:
said step of associating includes entering the values for said plurality of variables in any order that is convenient.

30. A method, as claimed in claim 1, wherein:
said step of calculating includes determining only a single value for the navigational parameter using the values of said plurality of variables.

31. A method, as claimed in claim 24, wherein:
said step of providing includes identifying, using the input device, when the previously defined value of each of said plurality of variables is acceptable for use in calculating the value of said navigational parameter in any order that is convenient.

32. A method, as claimed in claim 24, wherein:
said step of providing includes selecting, using the input device, a navigational parameter that can be calculated by the navigational calculator.

* * * * *